Jan. 24, 1967   C. FRIIS   3,300,209
SPRING CONTROLLED AND CUSHIONED SPRINGBOARD DEVICES
Filed Feb. 27, 1964   3 Sheets-Sheet 1
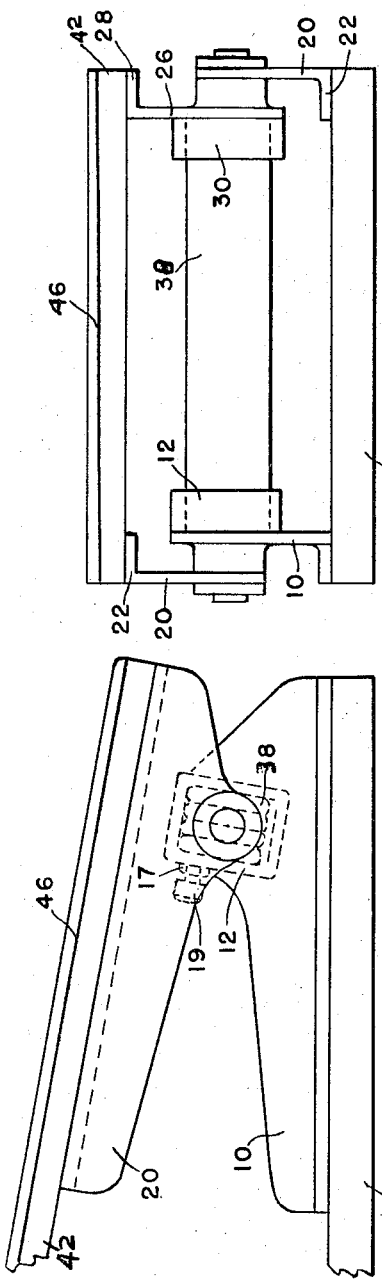
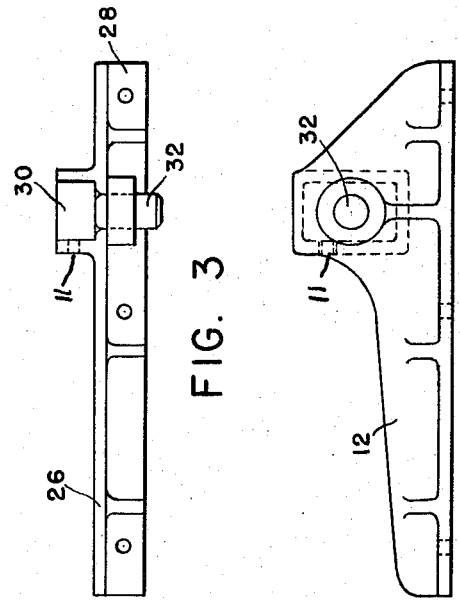
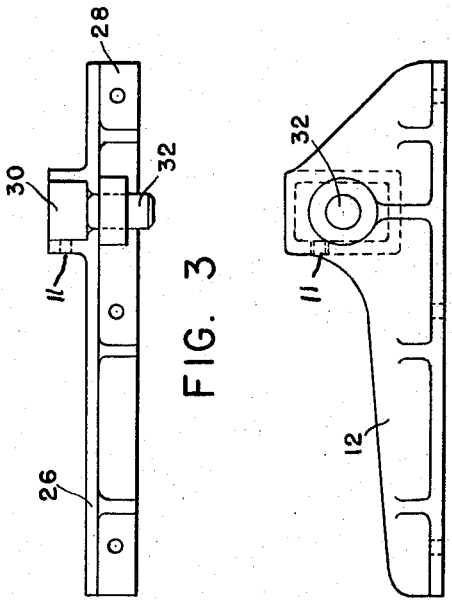
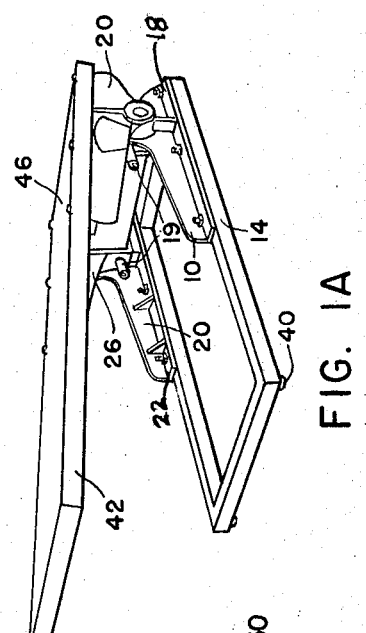
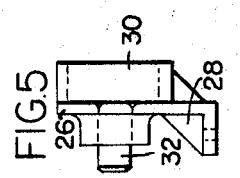
*INVENTOR*
*CARSTEN FRIIS*

Jan. 24, 1967   C. FRIIS   3,300,209
SPRING CONTROLLED AND CUSHIONED SPRINGBOARD DEVICES
Filed Feb. 27, 1964   3 Sheets-Sheet 2

INVENTOR.
CARSTEN FRIIS
BY H. F. Woodward
atty.

Jan. 24, 1967     C. FRIIS     3,300,209
SPRING CONTROLLED AND CUSHIONED SPRINGBOARD DEVICES
Filed Feb. 27, 1964     3 Sheets-Sheet 3

*INVENTOR.*
CARSTEN FRIIS
BY H. F. Woodward
atty

United States Patent Office 3,300,209
Patented Jan. 24, 1967

3,300,209
SPRING CONTROLLED AND CUSHIONED
SPRINGBOARD DEVICES
Carsten Friis, Minneapolis, Minn., assignor to Central
Machine Works Company, Minneapolis, Minn.
Filed Feb. 27, 1964, Ser. No. 347,903
2 Claims. (Cl. 272—66)

The invention relates to spring controlled and cushioned devices and more particularly to diving boards for placement on structures bordering on or overlooking water, such as shoulders of swimming pools, rafts, docks, deck of boats, etc.

The central object of the invention is to provide a spring controlled device where noisy rebound is eliminated and smooth operation provided.

Another object of the invention is to reduce the space, from front to rear, required by diving board installations.

A further object of the invention is economy in the cost of spring controlled or cushioned devices and facility in their installations.

Other and further objects of the invention and the advantages of the same will be pointed out hereinafter and indicated in the appended claims, or will be obvious to one skilled in the art upon understanding the present disclosure.

Figure 6:
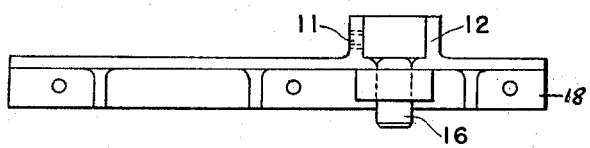
Figure 7:
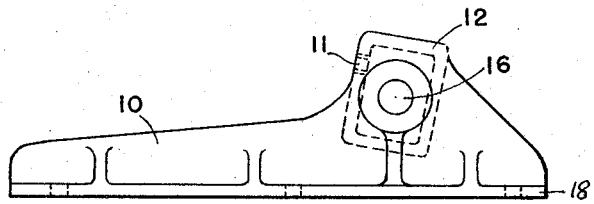
Figure 8:
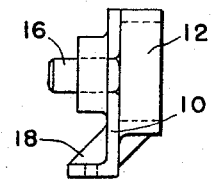
Figure 9:
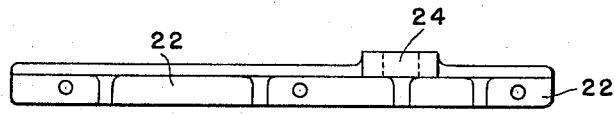
Figure 10:
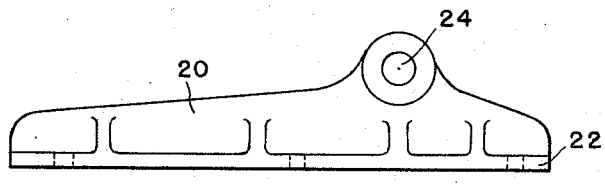
Figure 11:
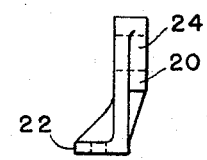
Figure 12:
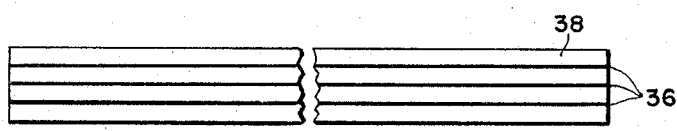
Figure 13:
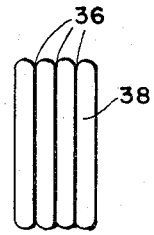
Figure 14:
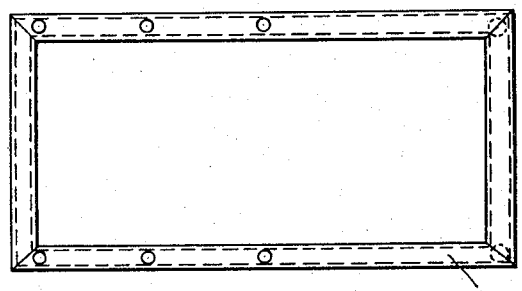
Figure 15:
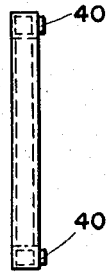
Figure 16:
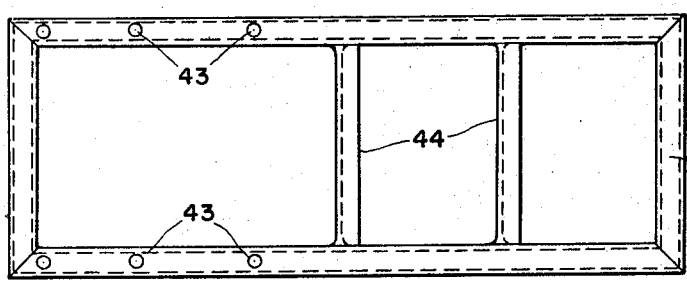
Figure 17:
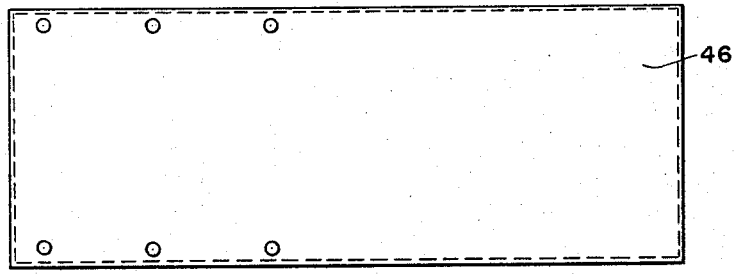

FIGURE 1A is a perspective view of the new device;
FIGURE 1 is a side view of the new device;
FIGURE 2 is an end view of the device shown in FIGURE 1;
FIGURE 3 is a top view of spring pocket to be used on the top on one side;
FIGURE 4 is a side view of spring pocket;
FIGURE 5 is an end view of the spring pocket;
FIGURE 6 is a top view of the spring pocket to be employed on side opposed to that on which spring pocket shown in FIGURE 3 is used;
FIGURE 7 is a side view of the device shown in FIGURE 6;
FIGURE 8 is an end view of the device shown in FIGURE 7;
FIGURE 9 is a top view of a pivot bracket to be used on the top of the device on the same side as spring pocket shown in FIGURE 7;
FIGURE 10 is a side view of the pivot bracket shown in FIGURE 9;
FIGURE 11 is an end view of the device shown in FIGURE 10;
FIGURE 12 is a top plan view of the spring arrangement;
FIGURE 13 is an end view of the springs;
FIGURE 14 is a top plan view of the base frame or load supporting member;
FIGURE 15 is an end view of the base frame;
FIGURE 16 is a top view of the upper frame or load carrying member;
FIGURE 17 is a top view of an upper base frame cover.

Referring to the drawings in detail the base plate or load supporting member 14 is operatively attached to upper frame member or load carrying member 42 in the manner hereinafter described to eliminate noisy rebound and provide a smooth operation.

Flange 18 of bottom spring bracket 10 is attached to the base plate 14 by suitable means e.g. bolts passing through the flange 18. The spring bracket 10 is provided with spring sprocket 12 which may be provided with threaded opening 11 for reception of set screw 19 for securing one end of the spring member 38 in place. A stub shaft 16 is carried by the spring bracket 10 (FIGURES 6, 7 and 8). The stub shaft 16 may be a stud welded in an opening extending through bracket 10 and into the central portion of the bottom of spring pocket 12. It is to be understood that the stub shaft 16 may be formed as part of the bracket 10.

A pivot bracket 20 is suitably secured to upper plate or load carrying member 42. The bracket 20 generally is provided with flange 22 which may have threaded openings for the use of bolts in attaching the bracket 20 to the plate 42. The pivot bracket is provided with opening 24 for receiving the stub shaft 16 of the spring bracket 10. The pivot bracket 20 is shown in FIGURES 9, 10 and 11.

On the side opposed to spring bracket 10 and attached to base plate 14 is pivot bracket 20 which is similar to pivot bracket just described and has opening 24 to receive stud shaft 32 of upper spring bracket 26.

Upper spring bracket 26 is attached to upper plate 42 by any suitable means, e.g. bolts passing through openings in flange 28. (FIGURES 3, 4 and 5). The spring bracket 26 has spring pocket 30 for receiving an end of spring 38. A stub shaft is secured by suitable means in an opening in the bracket 26. This stub shaft may be a stud welded in the opening extending through the bracket 26 and into the central portion of spring pocket 30. The shaft 32 may be formed in any suitable manner as long as it is rigidly attached to the bracket 26 in the position shown in FIGURES 3, 4 and 5. The load supporting frame 14 shown in FIGURES 14 and 15 should be of rigid c construction and may be provided with adjustable feet 40. It being understood that the feet 40 may be replaced with securing means for fastening the frame 14 rigidly in place.

The load carrying member 42 may be of various shapes and designs but a rectangular shape as shown in FIGURE 16 has proven satisfactory. The frame 42 may be strengthened by use of cross member 44. Openings 43 may be provided for reception of securing means for cover, seat 46 or the like depending upon the use of the device.

In FIGURES 12 and 13 is shown the spring members 38 which is to be employed. The spring member is at substantially right angles to the axis of the top load carrying member as shown in FIGURES 1 and 1A. The number of leaf springs should be varied according to the load to be carried by the member 42. In the drawings cushioning material 36 is positioned between the leaf springs. The cushioning material preferably is rubber or rubber-like material.

One end of spring member 38 is positioned in pocket 12 of the bracket 10 and the set screw 19 is used to lock the spring in place. A lock nut 17 may be employed to prevent accidental loosing of the set screw 19. The other end of spring 38 is secured in pocket 30 of bracket 26. There can occur no sidewise or twisting motion of the load carrying member. It will be noted that the spring 38 is substantially in direct alignment with and on substantially the horizontal plane of the pivot studs 16 and 32.

In accordance with the patent statutes, there has been described the principles of construction and operation of the improvement in spring controlled and cushioned devices, and while I have endeavored to set forth the best embodiment thereof, I desire to have it understood that changes may be made within the scope of the following claims without departing from the spirit of my invention.

What is claimed is:
1. A diving board assembly adapted to be mounted adjacent a body of water, the assembly comprising a load supporting base, a load carrying frame extending above and substantially parallel to said base, a diving board mounted on said frame, means operatively attaching said frame and said base at their rear ends, said means com- prising a spring bracket removably attached to the base, a spring receiving pocket on said spring bracket, a stub shaft in said spring bracket and substantially in line with the center of said spring receiving pocket, a pivotal bracket removably attached to the frame, said pivotal bracking having a stub shaft receiving opening therein, the stub shaft on the spring bracket extending into the stub shaft receiving opening in the pivotal bracket, a second spring bracket removably attached to the frame, a second spring receiving pocket on the said second spring bracket, a second stub shaft on the said second spring bracket and substantially in line with the second spring receiving pocket, a second removable pivotal bracket attached to the base, said second pivotal bracket having a stub shaft receiving opening therein, the stub shaft on the second spring bracket extending into the stub shaft opening in the second pivotal bracket, a spring member having its ends in the spring receiving pockets, said spring member extending substantially at right angles to the axis of the frame, and removable means for securing the base spring member in said pockets.

2. The diving board assembly set forth in claim 1 in which the spring member is a plurality of leaves, and cushioning means between the leaves.

References Cited by the Examiner
UNITED STATES PATENTS

| | | | |
|---|---|---|---|
| 1,693,669 | 12/1928 | Rohmer | 272—66 |
| 2,590,563 | 3/1952 | Nightingale | 267—57 X |
| 2,789,812 | 4/1957 | Ruegg et al. | 267—57 |
| 2,867,841 | 1/1959 | Baldauf | 267—1 X |
| 3,104,095 | 9/1963 | Eirhart | 267—57 |

FOREIGN PATENTS 189,455   4/1957   Austria.

RICHARD C. PINKHAM, *Primary Examiner.*

A. W. KRAMER, *Assistant Examiner.*